United States Patent
Lamson

(10) Patent No.: US 10,544,849 B2
(45) Date of Patent: Jan. 28, 2020

(54) SHOCK ABSORBERS FOR PROTECTIVE BODY GEAR

(71) Applicant: Xenith, LLC, Lowell, MA (US)

(72) Inventor: Kyle Lamson, Chelmsford, MA (US)

(73) Assignee: XENITH, LLC, Lowell, MA (US)

( * ) Notice: Subject to any disclaimer, the term of this patent is extended or adjusted under 35 U.S.C. 154(b) by 3 days.

(21) Appl. No.: 15/751,712

(22) PCT Filed: Aug. 10, 2016

(86) PCT No.: PCT/US2016/046326
§ 371 (c)(1),
(2) Date: Feb. 9, 2018

(87) PCT Pub. No.: WO2017/027576
PCT Pub. Date: Feb. 16, 2017

(65) Prior Publication Data
US 2018/0274620 A1    Sep. 27, 2018

Related U.S. Application Data

(60) Provisional application No. 62/203,755, filed on Aug. 11, 2015.

(51) Int. Cl.
*F16F 7/12* (2006.01)
*A42B 3/04* (2006.01)

(52) U.S. Cl.
CPC ............... *F16F 7/12* (2013.01); *A42B 3/04* (2013.01); *F16F 2224/0233* (2013.01); *F16F 2226/04* (2013.01); *F16F 2228/14* (2013.01)

(58) Field of Classification Search
CPC ............ F16F 1/3732; F16F 2224/0233; F16F 9/0472; F16F 1/374; F16F 7/12; A42B 3/124; A42B 3/04
See application file for complete search history.

(56) References Cited

U.S. PATENT DOCUMENTS

D241,228 S  *  8/1976  Boduch ................. D9/428
6,189,941 B1    2/2001  Nohr
(Continued)

FOREIGN PATENT DOCUMENTS

| EP | 0009654 A1 | 4/1980 |
|---|---|---|
| EP | 0652388 A1 | 5/1995 |
| EP | 0777064 A1 | 6/1997 |

OTHER PUBLICATIONS

International Search Report dated Oct. 31, 2016 for International Patent Application No. PCT/US2016/046326, 2 pages.
(Continued)

*Primary Examiner* — Thomas J Williams
*Assistant Examiner* — James K Hsiao
(74) *Attorney, Agent, or Firm* — Morgan, Lewis & Bockius LLP

(57) ABSTRACT

A shock absorber includes a bottom rim, a top wall comprising a raised central portion and a top rim, a side wall extending between the top and bottom rims, and a corrugation surrounding a periphery of the raised central portion that (i) connects the raised central portion to the top rim, (ii) descends to a depth below half a height of the side wall, and (iii) is separated by a distance from a surface. Impact forces imparted on the shock absorber are attenuated by a first amount in a first stage by resistive yielding of the side wall; by a second amount in a second stage by depression of the central portion and resistive yielding of the corrugation associated therewith; and by a third amount in a third stage by resistive yielding of the corrugation in response to a force applied to the top rim upon contact with the surface.

25 Claims, 10 Drawing Sheets

(56) References Cited

U.S. PATENT DOCUMENTS

| | | | |
|---|---|---|---|
| 6,231,095 B1 | 5/2001 | Chou et al. | |
| 7,644,911 B2 | 1/2010 | Rodecker | |
| 7,766,386 B2* | 8/2010 | Spingler | F16F 7/125 280/751 |
| 8,726,424 B2* | 5/2014 | Thomas | A42B 3/124 2/414 |
| 8,814,150 B2 | 8/2014 | Ferrara et al. | |
| 9,320,311 B2* | 4/2016 | Szalkowski | A42B 3/12 |
| 9,750,300 B2* | 9/2017 | Peyton | A43B 5/06 |
| 2002/0070584 A1* | 6/2002 | Carroll, III | B32B 3/28 296/187.03 |
| 2002/0105123 A1* | 8/2002 | Monson | F16F 1/374 267/140.11 |
| 2002/0105126 A1* | 8/2002 | Monson | F16F 1/374 267/141 |
| 2002/0163114 A1* | 11/2002 | Lobry | A47C 23/002 267/142 |
| 2003/0230866 A1* | 12/2003 | Lee | A63C 17/06 280/124.165 |
| 2004/0084820 A1* | 5/2004 | Kato | B60J 5/0444 267/141 |
| 2004/0128860 A1* | 7/2004 | Smaldone | A43B 1/0072 36/28 |
| 2006/0064900 A1* | 3/2006 | Aveni | A43B 13/183 36/28 |
| 2006/0070170 A1* | 4/2006 | Copeland | A42B 3/124 2/411 |
| 2007/0234527 A1* | 10/2007 | Aoyama | E05F 5/022 24/297 |
| 2007/0251782 A1* | 11/2007 | Chen | B60R 19/34 188/377 |
| 2008/0012384 A1* | 1/2008 | Sielhorst | B60R 21/04 296/146.7 |
| 2010/0299812 A1* | 12/2010 | Maddux | A41D 13/0156 2/414 |
| 2011/0296594 A1* | 12/2011 | Thomas | A42B 3/124 2/414 |
| 2012/0017358 A1* | 1/2012 | Princip | A42B 3/064 2/414 |
| 2015/0034439 A1* | 2/2015 | Galbus | B64F 1/02 188/377 |
| 2017/0027267 A1* | 2/2017 | Morgan | A42B 3/062 |

OTHER PUBLICATIONS

Written Opinion of the International Searching Authority dated Oct. 31, 2016 for International Patent Application No. PCT/US2016/046326, 6 pages.

Office action dated Dec. 11, 2018 for Canadian Patent Application No. 2,995,203; 3 pages.

* cited by examiner

SHOCK ABSORBERS FOR PROTECTIVE BODY GEAR

CROSS REFERENCE TO RELATED APPLICATIONS

This application is a National Stage patent application of International Application No. PCT/US2016/046326, filed Aug. 10, 2016, which claims priority to U.S. Provisional Application No. 62/203,755, entitled "Shock Absorbers for Protective Body Gear," filed Aug. 11, 2015, which are hereby incorporated by reference herein.

FIELD OF THE APPLICATION

The present application relates generally to shock absorbers. More particularly, the present application relates to shock absorbers for use in protective structures such as body gear.

BACKGROUND OF THE INVENTION

During sports and other physical activities, individuals are often exposed to impact forces that, if not at least partially attenuated, can cause severe injuries. Therefore, they usually wear protective sporting gear, such as helmets, shields, elbow and knee pads, etc. Such protective gear typically includes impact-attenuating structures that deform elastically and/or plastically in response to an impact force, thereby mechanically attenuating the impact. For example, many known helmets have a crushable foam layer disposed between a rigid or semi-rigid outer shell and an inner liner that conforms the helmet to the wearer's head.

Foams are generally customized to respond optimally to a specific range of impact energies, but outside this range, their effectiveness is significantly reduced. For impact energies exceeding the high end of the range, the foam is too soft and "bottoms out"—i.e., reaches maximum compression—before the impact is fully attenuated, resulting in the transfer of high impact forces to the body. For impact energies below the optimal range, on the other hand, the foam is too hard to compress, or "ride down," sufficiently to adequately prolong the distance and time over which deceleration occurs following impact, resulting in sudden, high peak forces. One way to improve the impact-attenuating capability of a foam layer is, typically, to decrease the density of the foam (i.e., make it softer) and increase the thickness of the layer, which results in an undesirable increase in the amount of material used. Exacerbating this trade-off, the maximum ride-down distance for most foams is only about 30-40% of the original height. Thus, about 60-70% of the foam layer adds to the bulk and weight, but not the impact-absorption capacity, of the protective structure. In addition, the performance of many foams degrades rapidly with repeated impacts. Other conventional impact-absorbing layers exhibit similar problems and limitations.

More recent helmet designs feature, in place of a continuous layer, discrete compression cells, which attenuate the impact with their side walls and/or by resistively venting a fluid through an orifice of the cell enclosure. These cells generally have ride-down distances close to their height, exhibit superior durability, and adapt to a wide range of impact energies. Furthermore, they provide opportunities for tailoring the impact-absorption characteristics of the helmet (or other protective structure) via the cell design. Such customization opportunities, however, have rarely been exploited.

BRIEF SUMMARY OF THE INVENTION

The present application provides shock absorbers for integration into protective structures, such as, for example, helmets and other protective body gear, as well as dashboards, shock-absorbing seating, and safety padding in vehicles, sporting equipment, and machinery. The shock absorbers absorb the impact in multiple stages with differing levels of attenuation. In some embodiments, the shock absorber includes a side wall that is thinner than walls that form a corrugation. As the force is first applied, in a first stage, the side wall deforms to provide a first level of attenuation. In a second stage, at least a portion of the corrugation deforms to provide a second level of attenuation. In a third stage, the corrugation comes into contact with a surface and thereby provides a third level of attenuation in response to the force.

In one aspect, a shock absorber for attenuating impact forces imparted thereto in stages of differing attenuation includes a top wall comprising a raised central portion and a top rim, a bottom rim, a side wall extending between the top and bottom rims, wherein the bottom rim has a diameter greater than or equal to that of any portion of the side wall, and a corrugation surrounding a periphery of the raised central portion that (i) connects the raised central portion to the top rim, (ii) descends to a depth below half a height of the side wall, and (iii) is separated by a distance from a surface. The impact forces imparted on the shock absorber are attenuated by a first amount in a first stage by resistive yielding of the side wall, by a second amount in a second stage by depression of the central portion and resistive yielding of the corrugation associated therewith, and by a third amount in a third stage by resistive yielding of the corrugation. In one embodiment, the corrugation is configured to yield in in response to a force applied to the shock absorber when the top rim contacts the surface.

In some embodiments, the first amount may be less than the second amount, and the second amount may be less than the third amount. The side wall may include a first region having a first acute angle with respect to a vertical reference line and a second region having a second acute angle with respect to the vertical reference line; the first acute angle may have a value less than that of the second acute angle, the first region may be closer to the bottom rim of the shock absorber than the second region, and the first and second regions may meet at a point disposed at approximately half the height of the side wall. The shock absorber may be configured to cause overlap in time between the first, second, and third stages. The shock absorber may be substantially cylindrically symmetric.

In another aspect, a method for attenuating impact forces imparted to a shock absorber in three stages of differing attenuation includes: 1) attenuating the impact forces by a first amount in a first stage by resistive yielding of a side wall of the shock absorber, wherein the side wall extends between a top rim and a bottom rim of the shock absorber, and the bottom rim of the shock absorber has a diameter equal to or greater than that of any portion of the side wall; 2) attenuating the impact forces by a second amount in a second stage by depression of a raised central portion of the shock absorber and resistive yielding of a corrugation of the shock absorber associated therewith, wherein the corrugation surrounds a periphery of the raised central portion and connects the raised central portion to the top rim; and 3) attenuating the impact forces by a third amount in a third stage by resistive yielding of the corrugation in response to a force applied to the top rim upon contact with a surface initially separated by a distance from the corrugation. The corrugation may descend to a depth below half a height of the side wall.

The first amount may be less than the second amount, and the second amount may be less than the third amount. The side wall may include a first region having a first acute angle with respect to a vertical reference line and a second region having a second acute angle with respect to the vertical reference line; the first acute angle may have a value less than that of the second acute angle, the first region may be closer to the bottom rim of the shock absorber than the second region, and the first and second regions may meet at a point disposed at approximately half the height of the side wall. The occurrence of at least one of the first, second, and third stages may overlap the occurrence of another of the first, second, and third stages shock absorber. The shock absorber may be substantially cylindrically symmetric.

These and other objects, along with advantages and features of the present application herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE SEVERAL VIEWS OF THE DRAWINGS

The aforementioned implementation of the present application as well as additional implementations will be more clearly understood as a result of the following detailed description of the various aspects of the application when taken in conjunction with the drawings. It should be understood, however, that the invention is not limited to the precise arrangements and instrumentalities shown.

DETAILED DESCRIPTION OF THE INVENTION

Figure 1:
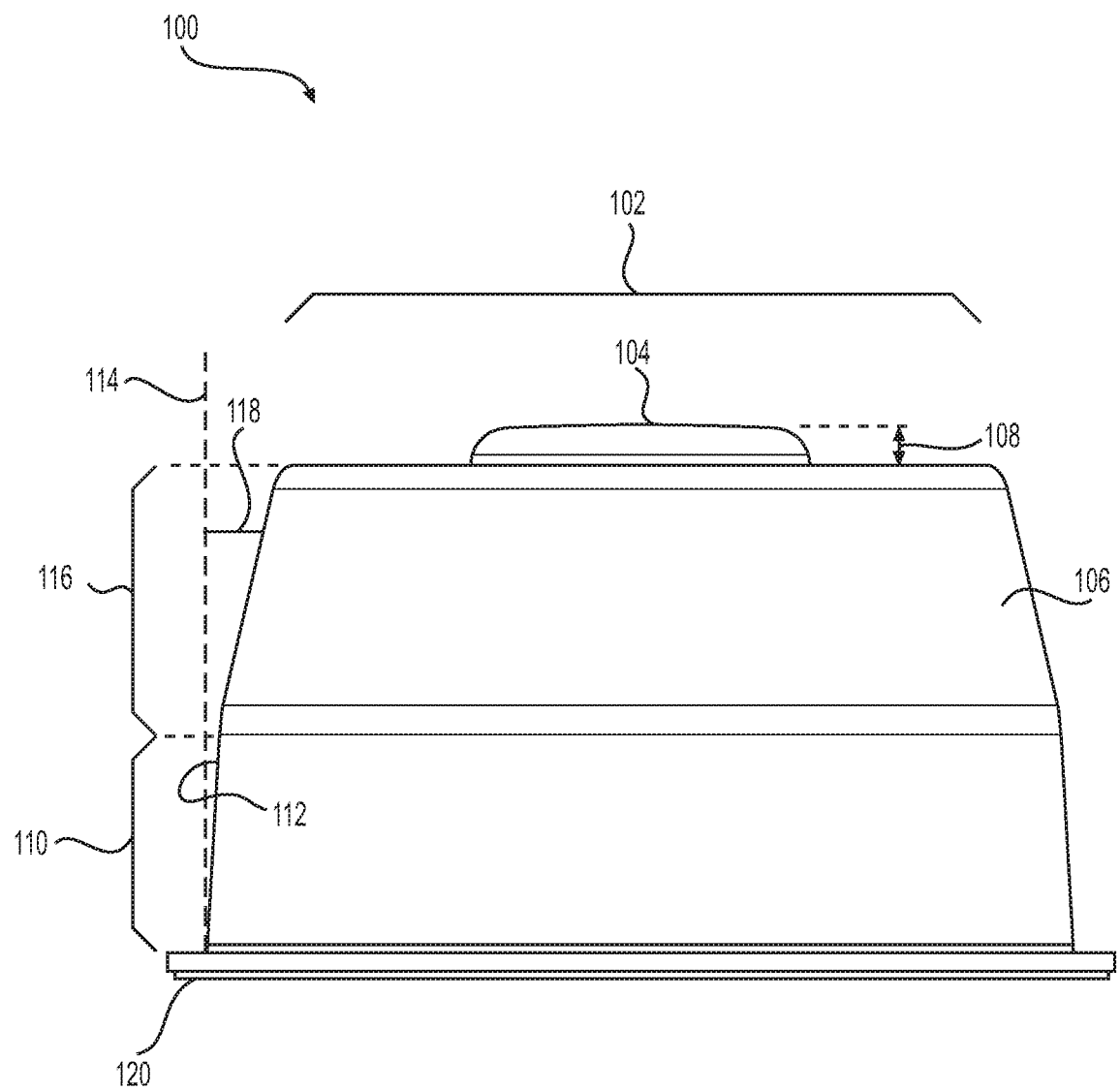
FIG. 1 illustrates a side view of a shock absorber in accordance with one embodiment of the present invention.

Shock absorbers in accordance herewith may be fabricated from a variety of elastic and semi-elastic materials, including, for example, rubbers, thermoplastics, and other moldable polymers. In one embodiment, thermoplastic elastomer (TPE) is used. Commercially available TPEs include the ARNITEL and SANTOPRENE brands. Other materials that may be used include, for example, thermoplastic polyurethane elastomers (TPUs) and low-density polyethylene (LDPE). In general, the material selection depends on the particular application, and may be readily made, without undue experimentation, by a person of skill in the art based on known material properties. Further, the desired shape and configuration of the shock absorber may generally be created using any of a number of well-known manufacturing techniques, such as, e.g., blow molding or injection molding. The shock absorber may be manufactured in one piece or multiple pieces. Bonding may be accomplished, for example, with an adhesive (such as glue), or using a thermal bonding process. Mechanically interlocking features, clamps, or similar devices may be used to assure that the multiple parts remain affixed to each other. Similar elements may be referred to throughout the specification using similar or the same reference numerals.

FIG. 1 illustrates a side view of a shock absorber 100 in accordance with one embodiment of the present invention. As shown, a top wall 102 of the shock absorber 100 may include a central portion 104 that is raised above the height of side walls 106; the difference in height (height 108) may be, for example, 5 mm or 10 mm. In other embodiments, the central portion 104 may be substantially the same height as the side walls 106 and the height 108 is substantially zero. The central portion 104 may be cylindrical in shape, but the present application is not limited to any particular shape for the central portion 104.

In some embodiments, a first portion 110 of the side walls 106 is disposed at a first angle 112 from a vertical reference line 114. A second portion 116 of the side walls 106 is disposed at a second angle 118 from the vertical reference line 114. As shown in FIG. 1, each of the angles 112, 118 may be an acute angle, and the first portion 110 may be closer to the bottom of the shock absorber 100 than the second portion 116. In some embodiments, the second angle 118 is greater than the first angle 112. In other embodiments, the first angle 112 is greater than or equal to the second angle 118. The first angle 112 may be, for example, 1-3 degrees, and the second angle 118 may be, for example, 2-5 degrees. Any value of the angles 112, 118 or profile configuration for the side walls 106 is within the scope of the present application. In one embodiment, a bottom rim 120 of the side walls 106 represents a widest part of the side walls 106; the two angles 112, 118 deviate from the vertical line 114 in the same direction, and each other part of the side walls 106 has a smaller diameter than that at the bottom rim 120. Because the bottom rim 120 may have a diameter equal to or greater than the widest part of the side walls 106, the shock absorber 100 may be manufactured using a process that requires only a single injection step of, for example, TPU. In other embodiments where the bottom rim 120 is not the widest part of the side walls 106, a second injection step may be necessary to ensure that sufficient material is present near the bottom rim 120.

Figure 2:
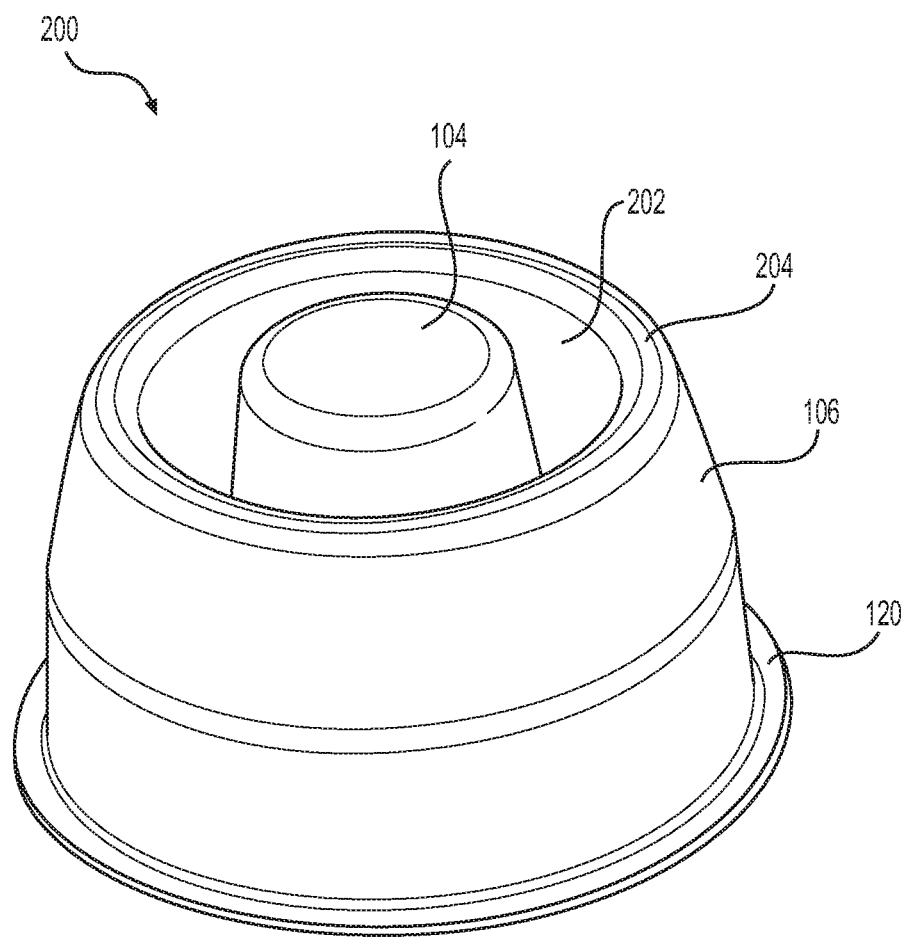
FIG. 2 illustrates a top perspective view of a shock absorber in accordance with one embodiment of the present invention.
Figure 3:
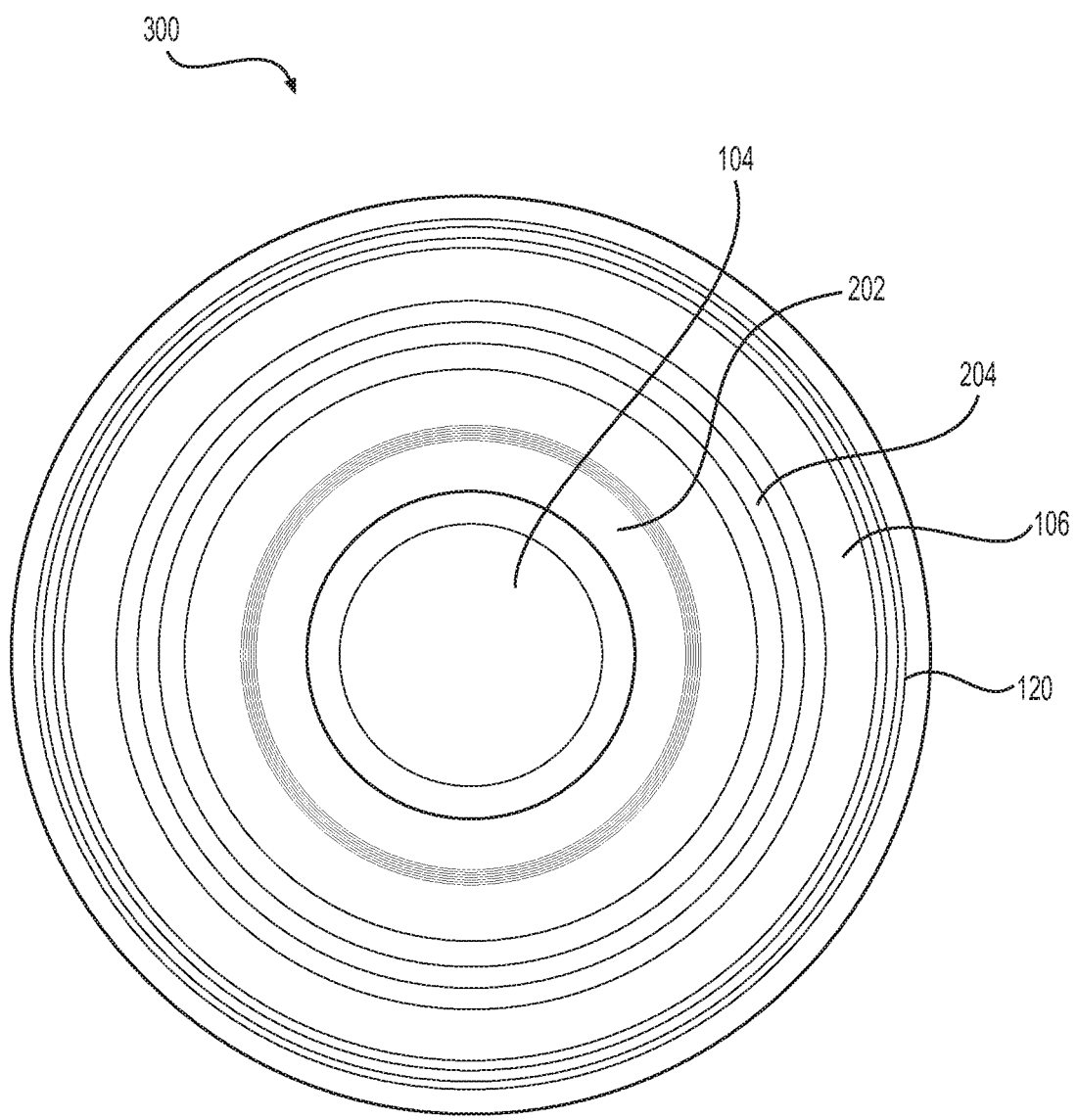
FIG. 3 illustrates a top view of a shock absorber in accordance with one embodiment of the present invention.

FIG. 2 illustrates a perspective view of a shock absorber 200 in accordance with another embodiment of the present invention. The shock absorber 200 may include a central portion 104, side walls 106, and a base 120 (e.g., a bottom rim). A corrugation 202 separates the central portion 104 from a top rim 204. In some embodiments, the central portion 104 and the top rim 204 form a top wall of the shock absorber 200 (e.g., the top wall 102 of the shock absorber 100 in FIG. 1). The side walls 106 extend between the top rim 204 and the bottom rim 120. Furthermore, the corrugation 202 may surround a periphery of the central portion 104 and connects the central portion 104 and the top rim 204. FIG. 3 illustrates a top view of a shock absorber 300 in accordance with another embodiment of the present invention that may include the central portion 104, corrugation 202, top rim 204, side walls 106, and bottom rim 120. The corrugation 202 may be a continuous element which extends all the way around the central portion 104 or may only partly extend around the central portion, or intermittently extend around the central portion.

Figure 4:
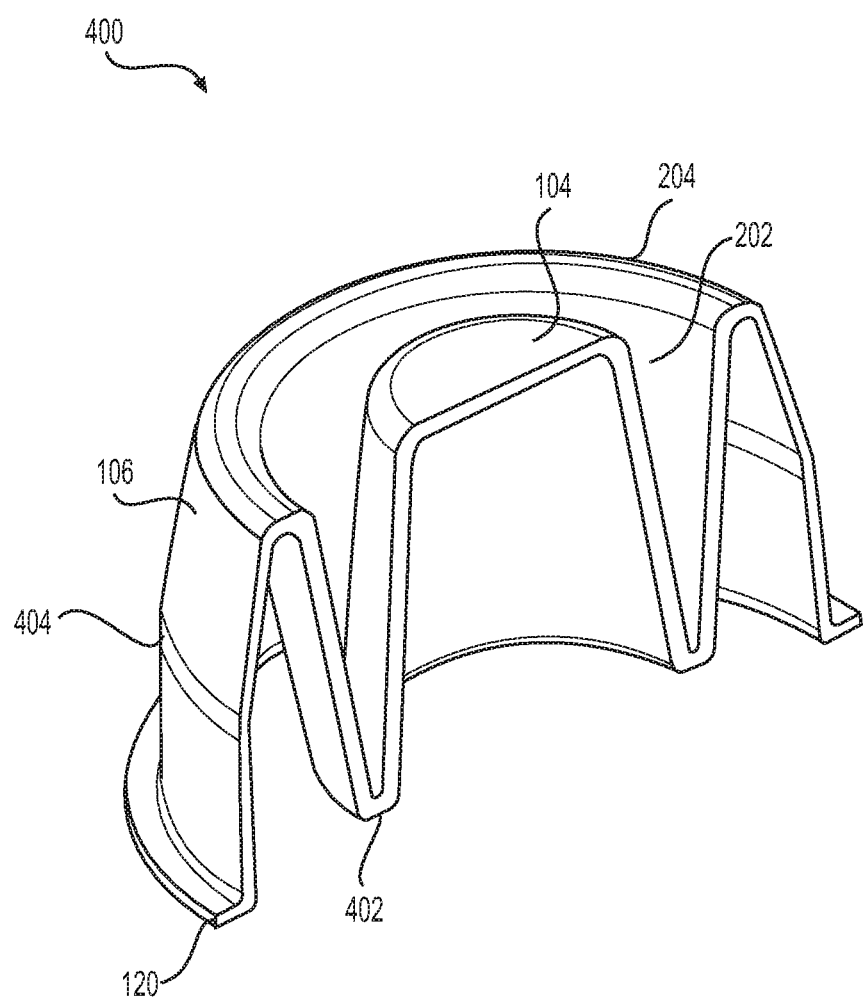
FIG. 4 illustrates a top perspective, sectional view of a shock absorber in accordance with one embodiment of the present invention.

Turning now to FIG. 4, a shock absorber 400 is shown which may include the central portion 104, corrugation 202, top rim 204, side walls 106, and bottom rim 120. FIG. 4 is a perspective sectional view of the shock absorber 400 in accordance with another embodiment of the present invention. As shown in FIG. 4, the corrugation connects the top rim 204 to the raised central portion 104 in a "V" shape having a lowest portion 402. Although a single "V" shape is shown, the corrugation may include any number of connected "V" shapes. In one embodiment when multiple "V" shapes are used, the top or bottom portions of the "V" may extend all the way to the height of the top rim 204 or the lowest portion 402. In other embodiments, the top and bottom portions of a multiple "V" shaped corrugation need not extend to the full height of the top rim 204 or the lowest portion 402 but could stop somewhere in between. In one embodiment, the lowest portion 402 of the corrugation 202 is disposed below the midpoint 404 of the height of the side walls 106. In another embodiment, the lowest portion 402 of the corrugation 202 is disposed at or above the midpoint 404. The shock absorber 400 may include a bottom wall or "floor" (not shown). In one embodiment, the shock absorber 400 does not include a floor and is affixed directly to a surface, such as the interior of a helmet, and the surface with which the bottom portion 402 comes into contact during compression (as explained in greater detail below) is the interior surface of the helmet. In other embodiments, the shock absorber 400 includes a bottom wall or floor, the surface of which comes into contact with the bottom portion 402 during compression. The bottom wall may be manufactured as part of the shock absorber 400 or manufactured separately and affixed to the shock absorber after manufacture. In one embodiment, the bottom wall is part of an enclosure that houses the shock absorber 400; the enclosure with the shock absorber 400 inside is thereafter affixed to a helmet or other article.

Figure 5:
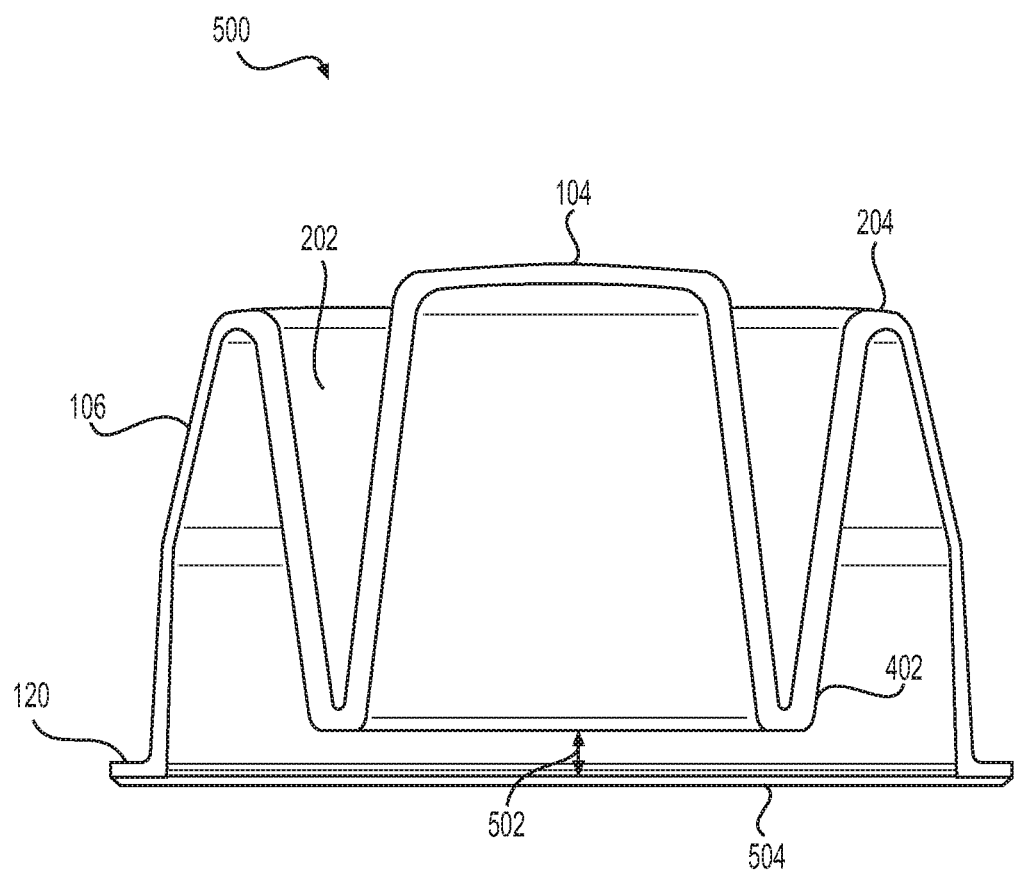
FIG. 5 illustrates a side sectional view of a shock absorber in accordance with one embodiment of the present invention.

FIG. 5 is a side perspective view of a shock absorber 500 which includes the bottom portion of the corrugation 202 separated by a distance 502 from a bottom wall 504 (as stated above, the bottom wall 504 may be attached to or integrated into the shock absorber 500 or may be a component separate from the shock absorber 500 such as the interior surface of a helmet). The distance 502 may be any value, such as, for example, 5 mm, 10 mm, or 15 mm; any value is within the scope of the present application, however. In one embodiment, the distance 502 is the same as the height 108 (FIG. 1). In another embodiment, the distance 502 is greater than the height 108. In yet another embodiment, the distance 502 is less than the height 108. The thickness of the side walls 106 may be less than the thickness of the corrugation 202. For example, the side walls 106 may be 0.8-1.0 mm thick and the corrugation 202 may be 1.5 mm thick. As explained further below, the thinner side walls 106 may resistively yield (i.e., deform) to an impact force before the corrugation 202 yields due to the side walls' comparative thinness. In other embodiments, the side walls 106 can have the same or greater thickness than the corrugation 202 but can still respond first to an impact force due to its composition. For example, the composition may be of a material or a blend of materials that is different from that of the corrugation 202, or include impurities, perforations, etc. that weaken it in comparison to the corrugation 202. In other embodiments, the shape or profile of the side walls 106 can make it weaker compared to the corrugation 202. The side walls 106 may have a uniform thickness along their height or may have relatively thinner sections to create a deformation zone.

Figure 6:
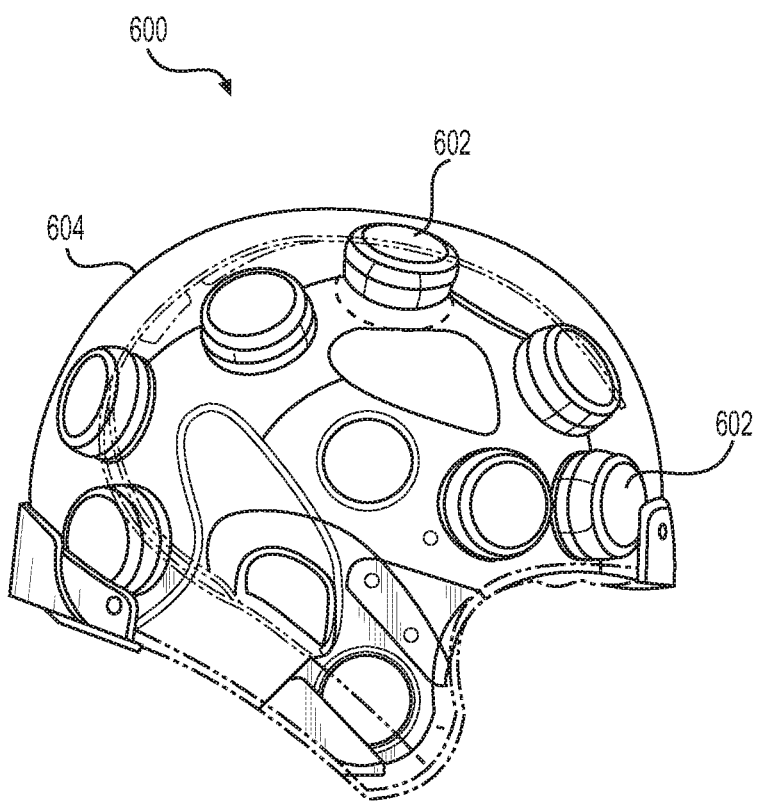
FIG. 6 illustrates a helmet having shock absorbers in accordance with one embodiment of the present invention.

FIG. 6 is an illustration of a helmet 604 having shock absorbers 602 in accordance with another embodiment of the present invention. Specifically, FIG. 6 illustrates a system 600 having a plurality of shock absorbers 602 affixed to the inner surface of the helmet 604. As illustrated, the shock absorbers 602 are disposed in enclosures but, as explained above, the shock absorbers 602 may be placed directly on the inner surface of the helmet 604. The present application is not limited to only helmets, however, and the shock absorbers 602 may be placed on any protective body gear or any other article.

Figure 7:
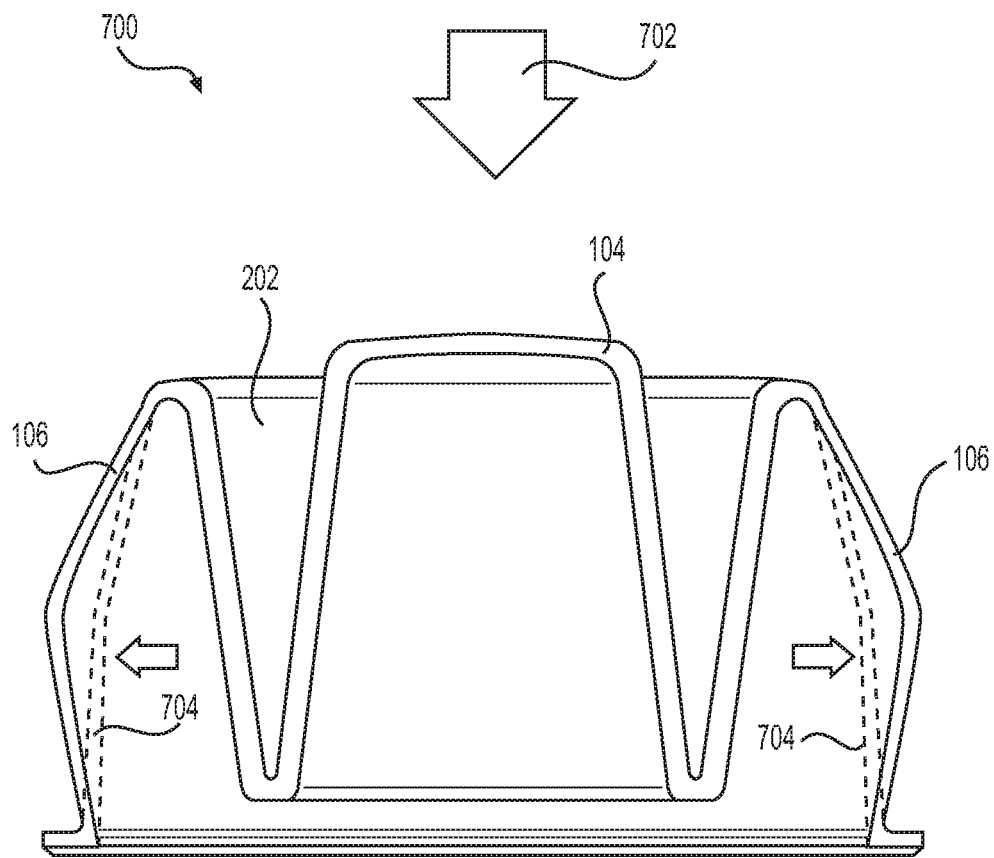
FIG. 7 illustrates a side sectional view of a shock absorber in a first stage of compression in accordance with one embodiment of the present invention.
Figure 8:
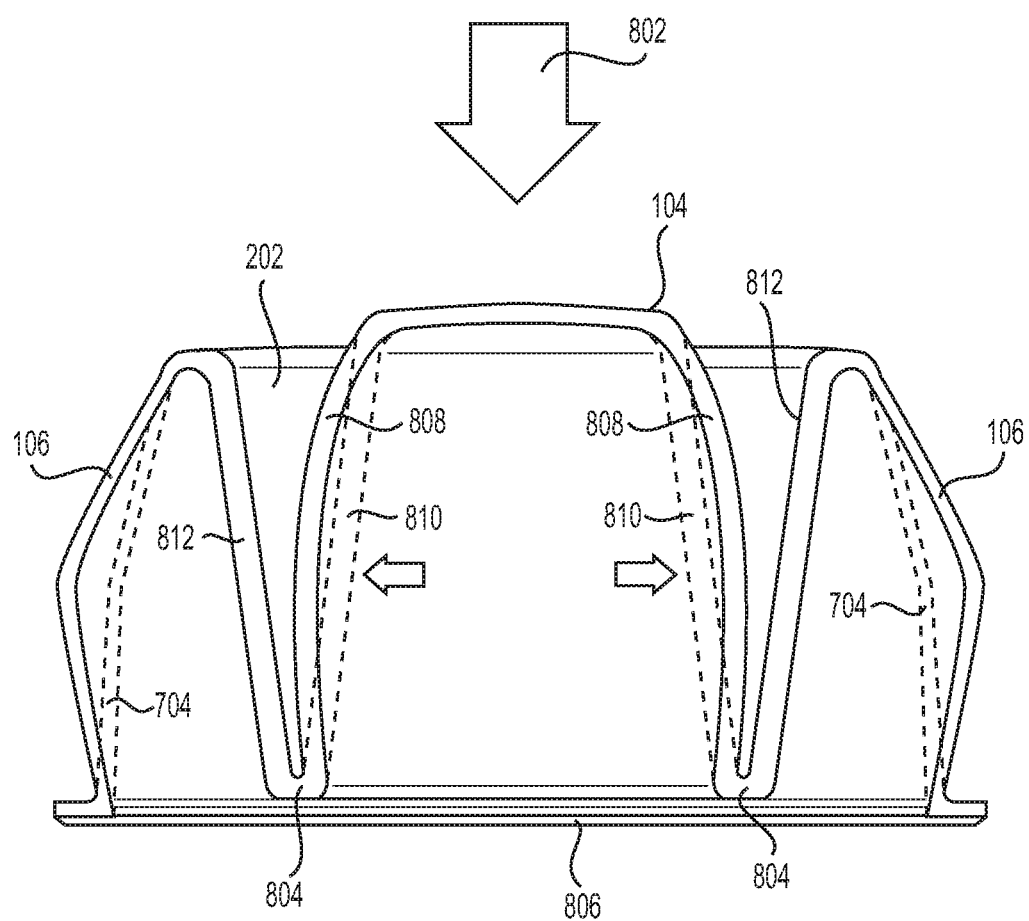
FIG. 8 illustrates a side sectional view of a shock absorber in a second stage of compression in accordance with one embodiment of the present invention.
Figure 9:
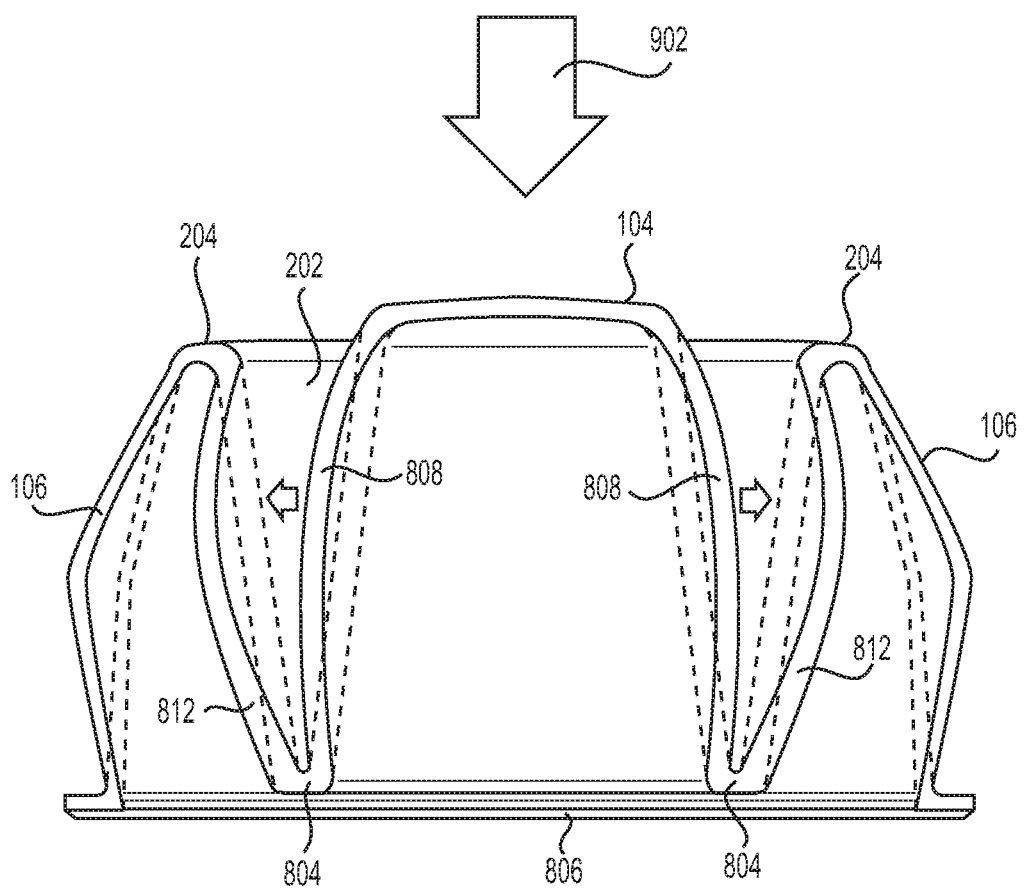
FIG. 9 illustrates a side sectional view of a shock absorber in a third stage of compression in accordance with one embodiment of the present invention.

FIGS. 7, 8, and 9 illustrate side sectional views of a shock absorber 700 as it responds to an impact force in various stages of compression. In FIG. 7, the shock absorber 700 is in the first stage of compression wherein the raised central portion 104 of the shock absorber 700 is subject to an impact force 702. As the central portion 104 moves toward the lower surface, the side walls 106 respond by resistively yielding to the force to thereby attenuate the force by a first amount. The side walls 106 may curve outward from an original position 704 in response to the force. Any movement or deformation of the side walls 106 is within the scope of the present application, however; some or all of the side walls 106 may curve inward. In this stage, there may be little to no deformation of the corrugation 202.

The second stage of compression is illustrated in FIG. 8. In this stage, the side walls 106 may continue to be deformed from their default position 704; the amount of deformation may increase, decrease, or stay the same during the second stage of compression. The force 802 applied to the raised central portion 104 causes the central portion to compress such that a lower portion 804 of the corrugation 202 comes into contact with a surface 806. As the raised central portion 104 is compressed, at least a portion of the corrugation 202 is deformed from its default position. In one embodiment, an inner portion 808 of the corrugation 202 moves away from its default position 810. In another embodiment, an outer portion 812 of the corrugation 202 moves away from its default position instead of, or in addition to, the inner portion 808. As a result of the resistance of the shock absorber provided at least by the deformation and/or movement of the corrugation 202, the force 802 can be attenuated by a second amount.

In the third stage of compression, as illustrated in FIG. 9, the bottom portion 804 of the corrugation 202 may be in contact with the surface 806, and a force 902 causes the side walls 106, inner portion 808 of the corrugation 202, and/or outer portion 812 of the corrugation 202 to deform further from their default positions. In this stage, the force 902 may be applied to the raised central portion 104 and the top rim 204; i.e., the heights of the raised central portion 104 and the top rim 204 may be designed such that they are approximately the same when the bottom portion 804 of the corrugation 202 is in contact with the surface 806. In other embodiments, the height of the raised central portion 104 may be greater than that of the top rim 204 even when the bottom portion 804 of the corrugation 202 is in contact with the surface 806. In such embodiments, the third stage of compression includes two sub-stages: a first sub-stage when the bottom portion 804 of the corrugation 202 first contacts the surface 806 and a second sub-stage when the height of the raised central portion 104 falls to that of the top rim 204 and the object providing the force 902 comes in contact with the top rim 204. In still other embodiments, the object providing the force 902 comes in contact with the top rim 204 before the bottom portion 804 of the corrugation 202 contacts the surface 806. As a result of the resistance of the shock absorber provided at least by the deformation and/or move of the corrugation 202, the force 902 can be attenuated by a third amount.

The forces 702, 802, 902 may be supplied by any object, such as a body part, helmet or pad, ball, or the ground, and may be direct, shear, oblique, rotational, or any other type of force or combination of forces. The forces 702, 802, 902 may be equal in magnitude; in this case, the three stages of compression progressively respond to the equal forces over time. In other embodiments, the forces 702, 802, 902 may differ in magnitude. In some embodiments, the shock absorber 700 may respond to the first force 702 by deforming its side walls 106 and thereby fully attenuate the force 702; in this case, the second and third stages are not required. When and if the second and third forces 802, 902 occur, the shock absorber 700 may respond by entering the second and third stages of compression. In some embodiments, the first amount can be less than the second amount, and the second amount can be less than the third amount. In some embodiments, the shock absorber can be configured to cause overlap in time between the first, second, and third stages.

Figure 10:
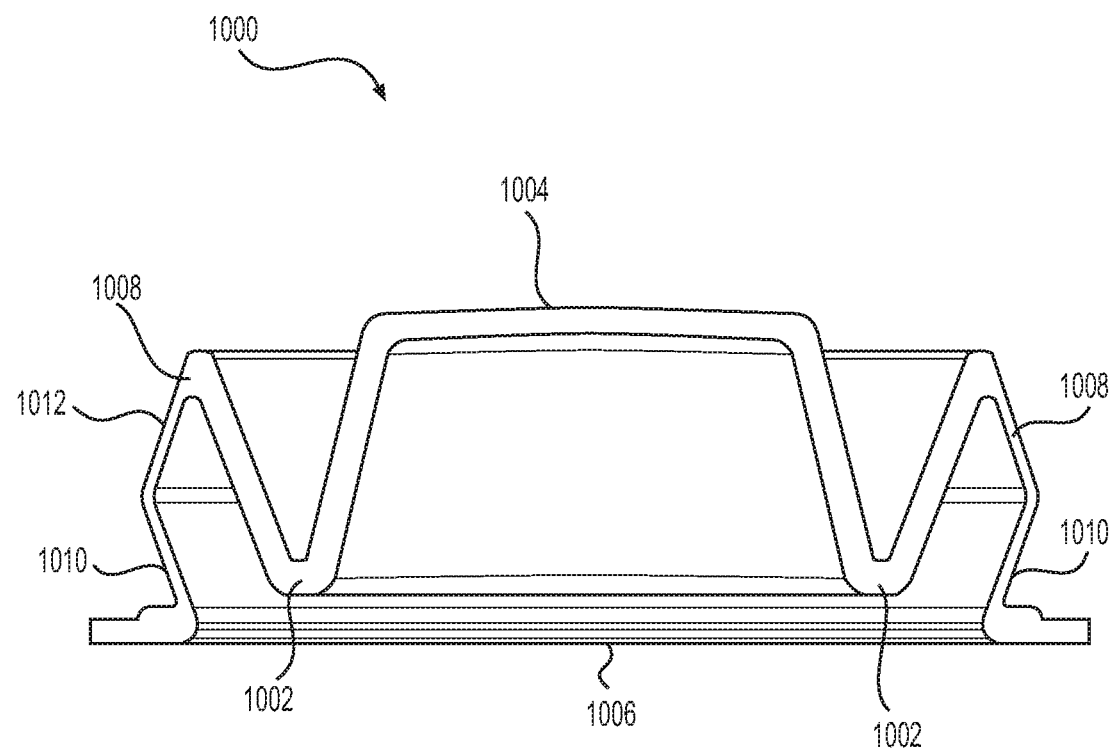
FIG. 10 illustrates a side view of a shock absorber in accordance with one embodiment of the present invention.

FIG. 10 illustrates a side view of a shock absorber 1000 in accordance with another embodiment of the present invention. As shown, the top wall of the shock absorber 1000 may include a central portion 1004 that is raised above the height of the uppermost side wall 1008. In other embodiments, the central portion 1004 may be the same height as the uppermost sidewall 1008. The central portion 1004 may be cylindrical in shape, but the present application is not limited to any particular shape for the central portion 1004. As the raised central portion 1004 is compressed, at least a portion of the corrugation 1002 is deformed from its default position. In some embodiments, the raised central portion 1004 may be depressed until the corrugation 1002 reaches the bottom wall 1006 (the bottom wall 1006 may be attached to or integrated into the shock absorber 1000 or may be separate from the shock absorber 1000 such as the interior surface of a helmet). In some embodiments, the uppermost sidewall 1008 is angled inwardly in a direction towards the central portion 1004 whereas a bottommost sidewall 1010 is angled outwardly in a direction away from the central portion 1004. The inwardly-angled uppermost sidewall 1008 and the outwardly-angled bottommost sidewall 1010 at their point of intersection create an intersecting angle 1012 that is greater than zero (0) degrees, and preferably in the range of 90 to 170 degrees. Any value of the intersecting angle 1012 or profile configuration for the side walls 1008, 1010 is within the scope of the present application.

In some embodiments, the thickness of the side walls 1008, 1010 is less than the thickness of the corrugation 1002; the side walls 1008, 1010 may be 0.8-1.0 mm thick, for example, and the corrugation 1002 may be 1.5 mm thick. Thinner side walls 1008, 1010 may resistively yield (i.e., deform) to an impact force before the corrugation 1002 due to their comparative thinness. In other embodiments, the side walls 1008, 1010 have the same or greater thickness than the corrugation 1002 but still respond first to an impact force due to their composition. For example, the composition of the side walls 1008, 1010 may be of a material or a blend of materials that is different from that of the corrugation 1002, or include impurities that weaken it with respect to the corrugation 1002. In other embodiments, the shape or profile of the side walls 1008, 1010 can make them weaker with respect to the corrugation 1002.

Certain embodiments of the present application are described above. It is, however, expressly noted that the present application is not limited to those embodiments; rather, additions and modifications to what is expressly described herein are also included within the scope of the application. Moreover, it is to be understood that the features of the various embodiments described herein are not, in general, mutually exclusive and can exist in various combinations and permutations, even if such combinations or permutations are not made express herein, without departing from the spirit and scope of the application. In fact, variations, modifications, and other implementations of what is described herein will occur to those of ordinary skill in the art without departing from the spirit and the scope of the application. As such, the application is not to be defined only by the preceding illustrative description. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A shock absorber for attenuating impact forces imparted thereto in stages of differing attenuation, the shock absorber comprising:
   a top wall comprising a raised central portion and a top rim;
   a bottom rim extending from a bottom wall plane;
   a side wall extending between the top and bottom rims; and
   a corrugation surrounding a periphery of the raised central portion that (i) connects the raised central portion to the top rim, (ii) descends to a depth below half a height of the side wall, and (iii) is separated by a distance from the bottom wall plane,
   wherein the shock absorber is configured to attenuate impact forces imparted on the shock absorber by a first amount in a first stage by resistive yielding of the side wall, by a second amount in a second stage by depression of the raised central portion and resistive yielding of the corrugation associated therewith, and by a third amount in a third stage by resistive yielding of the corrugation.

2. The shock absorber of claim 1, wherein the first amount is less than the second amount.

3. The shock absorber of claim 2, wherein the second amount is less than the third amount.

4. The shock absorber of claim 1, wherein the side wall comprises a first region having a first angle with respect to a vertical reference line and a second region having a second angle with respect to the vertical reference line, the second angle being different from the first angle.

5. The shock absorber of claim 4, wherein the first angle and the second angle are acute angles, the first angle having a value less than that of the second angle, the first region being closer to the bottom rim than the second region.

6. The shock absorber of claim 4, wherein the first region and the second region meet at a point disposed at approximately half the height of the side wall.

7. The shock absorber of claim 1, wherein the shock absorber is configured to cause overlap in time between the first, second, and third stages.

8. The shock absorber of claim 1, wherein the shock absorber is substantially cylindrically symmetric.

9. The shock absorber of claim 1, wherein the bottom rim has a diameter equal to or greater than that of any portion of the side wall.

10. The shock absorber of claim 1, wherein the corrugation is configured to yield in response to a force applied to the shock absorber when the corrugation contacts the bottom wall plane.

11. The shock absorber of claim 1, wherein a lowest portion of the corrugation is disposed below a midpoint of the sidewall and spaced above the bottom rim.

12. The shock absorber of claim 1, wherein the raised central portion is raised above the height of the side wall.

13. The shock absorber of claim 1, wherein the side wall resistively yields to an impact force in the first stage before the corrugation yields in the second stage.

14. The shock absorber of claim 13, wherein the corrugation yields in the second stage before the corrugation further yields in the third stage.

15. A method for attenuating impact forces imparted to a shock absorber in stages of differing attenuation, the method comprising:
attenuating the impact forces by a first amount in a first stage by resistive yielding of a side wall of the shock absorber, the side wall extending from a bottom wall plane between a top rim and a bottom rim of the shock absorber;
attenuating the impact forces by a second amount in a second stage by depression of a raised central portion of the shock absorber and resistive yielding of a corrugation of the shock absorber associated therewith, the corrugation surrounding a periphery of the raised central portion, connecting the raised central portion to the top rim; and
attenuating the impact forces by a third amount in a third stage by resistive yielding of the corrugation in response to a force applied to the top rim upon contact with the bottom wall plane initially separated by a distance from the corrugation.

16. The method of claim 15, wherein the first amount is less than the second amount.

17. The method of claim 16, wherein the second amount is less than the third amount.

18. The method of claim 15, wherein the side wall comprises a first region having a first angle with respect to a vertical reference line and a second region having a second angle with respect to the vertical reference line, the second angle being different from the first angle.

19. The method of claim 18, wherein the first angle and the second angle are acute angles, the first angle having a value less than that of the second angle, the first region being closer to the bottom rim than the second region.

20. The method of claim 18, wherein the first region and the second region meet at a point disposed at approximately half a height of the side wall.

21. The method of claim 15, wherein the occurrence of at least one of the first, second, and third stages overlaps the occurrence of another of the first, second, and third stages.

22. The method of claim 15, wherein the bottom rim has a diameter equal to or greater than that of any portion of the side wall.

23. The method of claim 15, wherein the shock absorber is substantially cylindrically symmetric.

24. The method of claim 15, wherein the corrugation descends to a depth below half a height of the side wall.

25. The method of claim 15, wherein the second stage is initiated before the third stage and the first stage is initiated before the second stage.

* * * * *